United States Patent [19]

Takata et al.

[11] Patent Number: 4,912,351
[45] Date of Patent: Mar. 27, 1990

[54] PIEZOELECTRIC MOTOR

[75] Inventors: Keiji Takata, Tokorozawa; Shigeyuki Hosoki, Hachioji; Sumio Hosaka; Tsutomu Komoda, both of Tokyo, all of Japan

[73] Assignee: Hitachi, Ltd., Tokyo, Japan

[21] Appl. No.: 247,648

[22] Filed: Sep. 22, 1988

[30] Foreign Application Priority Data

Sep. 25, 1987 [JP] Japan .................. 62-238723

[51] Int. Cl.$^4$ ........................................... H01L 41/08
[52] U.S. Cl. .................................... 310/323; 310/358
[58] Field of Search ............... 310/323, 328, 330–332, 310/358, 359

[56] References Cited

U.S. PATENT DOCUMENTS

| | | | |
|---|---|---|---|
| 4,400,641 | 8/1983 | Vishnevsky et al. | 310/323 |
| 4,453,103 | 6/1984 | Vishnevsky et al. | 310/323 |
| 4,562,373 | 12/1985 | Tokushima et al. | 310/323 X |
| 4,613,782 | 9/1986 | Mori et al. | 310/323 |
| 4,645,964 | 2/1987 | Hiramatsu et al. | 310/323 |
| 4,742,260 | 5/1988 | Shimizu et al. | 310/323 |
| 4,786,836 | 11/1988 | Tokushima et al. | 310/323 |

FOREIGN PATENT DOCUMENTS

| | | | |
|---|---|---|---|
| 61-102177 | 3/1984 | Japan . | |
| 61-203872 | 7/1984 | Japan . | |
| 0091879 | 5/1985 | Japan | 310/323 |
| 0573828 | 9/1977 | U.S.S.R. | 310/323 |
| 0595813 | 3/1978 | U.S.S.R. | 310/323 |
| 0621397 | 8/1978 | U.S.S.R. | 310/328 |
| 0646395 | 2/1979 | U.S.S.R. | 310/328 |
| 0845198 | 7/1981 | U.S.S.R. | 310/328 |
| 0851561 | 7/1981 | U.S.S.R. | 310/328 |
| 0853711 | 8/1981 | U.S.S.R. | 310/323 |

OTHER PUBLICATIONS

"Ceramics", 21 (1986) No. 1, pp. 9–14.
"Applied Physics", 54 (1985), No. 6, pp. 589–590.

*Primary Examiner*—Mark O. Budd
*Attorney, Agent, or Firm*—Fay, Sharpe, Beall, Fagan, Minnich & McKee

[57] ABSTRACT

A piezoelectric motor is disclosed, which comprises a slider including a tabular vibrator in which a standing wave is excited, and a plurality of piezoelectric actuators securely mounted at the parts of the lower surface of the vibrator corresponding to the loop and node of the standing wave and adapted to be deformed in phase with the standing wave.

16 Claims, 6 Drawing Sheets

PIEZOELECTRIC MOTOR

BACKGROUND OF THE INVENTION

The present invention relates to a motor, or more in particular to a piezoelectric motor using an electromechanical transducer such as a piezoelectric material.

A conventional ultrasonic motor using a piezoelectric material is described in "Ceramics", 21 (1986), No. 1, pp. 9 to 14, "Applied Physics", 54 (1985), No. 6, pp. 589 to 590, and others.

The ultrasonic motor that was realized for the first time is of a vibrating-reed type. This type of the ultrasonic motor is for converting a longitudinal vibration of a piezoelectric member into an elliptical motion of the forward end of a vibrating reed which prods a moving element (slider) into motion. ("Ceramics", p. 10, FIG. 1)

The ultrasonic motor of this type has a thin vibrating reed with a small area of the forward end thereof, and therefore cannot produce a large torque on the one hand and poses the problem of short service life for low wear resistance on the other.

In order to solve this problem of endurance, an ultrasonic motor of travelling-wave type was conceived ("Ceramics", p. 10, FIG. 3). This type of ultrasonic motor utilizes the fact that when a travelling wave is caused in an elastic material, particles in the surface thereof are set in an elliptical motion, and is similar to the ultrasonic motor of vibrating-read type in that both are driven by friction due to elliptical motion.

On the other hand, a travelling wave is produced by superposing, for example, two standing waves different in time and spatial phase by $\pi/2$ respectively. In the case of a linear motor, in order to eliminate the effect of a wave reflected from the boundary of an elastic member, the end of the elastic member is curved ("Applied Physics", Vol. 54, No. 6 (1985), p. 589, FIG. 1) to cause the travelling wave to make a round in the surface, or a vibration absorber is mounted at the end thereof (See the same issue of the magazine at p. 590, FIG. 4). A rotary motor is constructed with two standing waves superposed on a ring (See the same issue of the magazine, at p. 590, FIG. 7).

The ultrasonic motor of travelling-wave type, as compared with the motor of vibrating-reed type, has an increased contact area and therefore has an improved wear resistance.

In the above-mentioned ultrasonic motor of travelling-wave type, though more advanced than the vibrating-reed type, the elastic member with a travelling wave excited therein is still in linear contact with a slider providing a moving unit. The disadvantage of a small contact area is not only a cause of a small wear resistance but results in a reduced driving force and a lower output efficiency due to the elastic deformation of the slider or the like.

Figure 13:
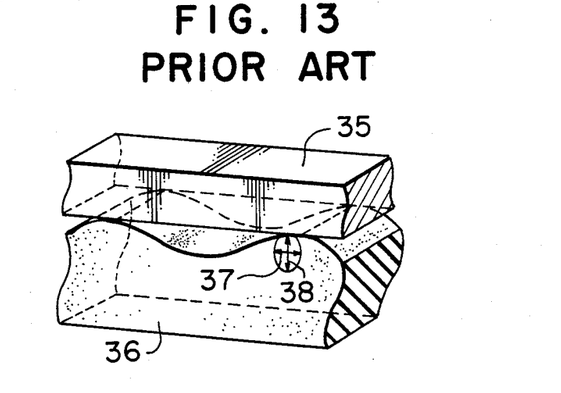
FIG. 13 is a diagram for explaining the operating principle of a conventional surface wave motor.

In order to solve this problem, JP-A-61-102177 and JP-A-61-203872 disclose a device comprising a slider 35 and elastic material member 36 which is deformed to increase the contact area for an increased driving force (FIG. 13). Nevertheless, the energy loss caused by the elastic deformation of the slider 36 reduces the efficiency. Further, the velocity component 38 of surface particles of the elastic member along the normal to the sliding surface, that is, that of the transverse wave increases while the component 37 of the longitudinal wave that provides a thrust extremely decreases with the distance from the wave front. The thrust is thus not increased considerably.

In driving an ultrasonic motor of travelling-wave type, it is necessary that the amplitude of the transverse wave be sufficiently large as compared with the surface roughness of the slider and the elastic member. For this purpose, a voltage of more than several volts is applied to the piezoelectric member of an ultrasonic motor of rotary type and several hundred volts to that of linear type to excite the travelling wave. The ratio of amplitude between the longitudinal and transverse waves, on the other hand, is fixed for each elastic member. As a result, the distance covered by each period of excitation is about a micron, which is substantially the degree of positional accuracy attained when the motor is used as an inching mechanism.

If the applied voltage to the piezoelectric member is increased to increase the velocity, the amplitude of the transverse wave that does not contribute to the moving speed of the slider is increased for an increased energy loss.

Generally, the excitation frequency of an ultrasonic motor is several ten KHz with the wavelength of several cm. This wavelength is the greatest bottleneck in reducing the size of the ultrasonic motor. Especially in the case of the linear motor, a construction with a curved end of the elastic member mentioned above to dampen the effect of the reflected wave requires a sufficiently large radius of curvature as compared with the wavelength, thus making it impossible to further reduce the size.

In a linear motor with transducers mounted at the ends of a metal bar, the excitation is not derived from the resonant frequency of the metal bar, and therefore a large, strong excitation mechanism is required ("Ceramics", 21, (1986), No. 1). If the travelling wave is to be absorbed and to realize a reciprocal motion, excitation mechanisms are required at both the ends. It is thus difficult to reduce the size. Further, a large and strong excitation mechanism causes a greater energy loss.

The magnitude of the wavelength is not only a bottleneck to a reduced size but leads to the disadvantage that a large contact area between the slider and the transducer is not secured. The linear motor described above uses an inflected wave to shorten the wavelength, which wave has a wavelength of, say, 43 mm with an aluminum bar of 6 mm square excited at 27 KHz. The wavelength is given as $\lambda = 2\pi(EI/\rho A)^{\frac{1}{4}}\omega^{-\frac{1}{2}}$ (E: Young's modulus, A: Sectional area, $\rho$: Density, and I: Second moment of area). Therefore, the wavelength is not reduced by one half for example, unless the sectional area of a transducer is increased 16 times. It is thus not an easy matter to increase the number of wave fronts in contact with the slider.

The transducer or the elastic member described above is made of duralumin or the like of high Young's modulus in order to improve the propagation efficiency of the elastic wave. This greatly limits the material making up the area in contact with the elastic member in view of the output efficiency.

SUMMARY OF THE INVENTION

An object of the present invention is to solve the above-mentioned problems, or specifically, to improve the driving force and the output efficiency by greatly increasing the area of contact between a moving unit (slider) and a stator.

Another object of the invention is to provide a motor in which the moving velocity and the minimum distance covered are selectable as desired.

In order to achieve the above-mentioned objects, the principle of the ultrasonic motor will be reviewed.

A moving unit (slider) is moved by the elliptical motion of surface particles of an elastic member (transducer) in which a longitudinal wave is superposed on a transverse wave.

The driving force is derived from the reciprocal motion along the direction of motion due to the longitudinal wave. If the elastic member is kept in contact with the moving unit, the driving force is not given in a single direction. For this reason, the elastic member is brought into contact with the moving unit by the reciprocal motion of the transverse wave only when the longitudinal wave has a velocity component only in one direction.

A high-performance ultrasonic motor is realized by optimizing these two functions independently of each other. Specifically, the above-mentioned objects can be achieved by using two separate elements having the functions of longitudinal and transverse waves respectively.

A standing wave is excited in, say, a moving unit by a piezoelectric member or the like. This standing wave is a transverse wave. A piezoelectric member adapted for reciprocal motion in phase with the standing wave along the direction of motion of the moving unit is mounted at each position with maximum amplitude or amplitude zero. The reciprocal motion of this piezoelectric member provides the thrust of the motor.

DESCRIPTION OF THE PREFERRED EMBODIMENTS

An embodiment of the present invention will be explained below with reference to FIGS. 1 and 2.

A plate element 4 of earth potential has placed thereon a moving unit including a vibrator element 1 and piezoelectric members 2, 3. The vibrator 1 is made of a piezoelectric material and is polarized in the direction of arrow P1 in the drawing. The piezoelectric members 2 and 3 are polarized also in the directions of arrows P2 and P3, respectively, in the drawing. The vibrator 1 carries an electrode 8 on the upper surface thereof of earth potential. The lower surface of the vibrator 1, on the other hand, has an electrode 7 connected by line 52 to an AC power supply 5. Further, an electrode 6 is mounted by insulating adhesive layer 11 from the electrode 7 on the lower surface of the electrode 7. The electrode 6 is connected by a line 53 through an amplifier 9 and a phase shifter 10 to the AC power supply 5.

The AC power supply 5 applies a voltage to the vibrator 1 to produce electric field having the direction of arrow E1 between electrodes 7 and 8, which is parallel to the direction of polarization indicated by arrow P1. The vibrator 1 is excited at a frequency in which the half-wavelength of the longitudinal (in the direction of arrow P) vibration coincides with the length of the vibrator 1 as measured parallel to (the direction of polarization P2, P3 of the piezoelectric members 2, 3). This is the primary resonance with the amplitude 0 (node) at the ends of the vibration and the maximum amplitude (loop) at the center of the vibrator 1. The piezoelectric members 2 and 3 are mounted at the positions of the node and loop, respectively. Electric fields E2, E3 are applied respectively to members 2, 3 in the direction perpendicular to the polarization P2, P3 by the voltage applied to the electrode 6 relative to ground potential of plate 4, thereby to repeat the shearing deformation. The thickness of the piezoelectric members 2 and 3 is sufficiently small as compared with the length of the vibrator 1, and therefore operates with a frequency lower than the resonance frequency of the piezoelectric members 2 and 3. The phase shifter 10 regulates the phase difference between the voltage of the electrode 6 and that of the electrode 7 to attain a vibrating condition described below.

Figure 1:
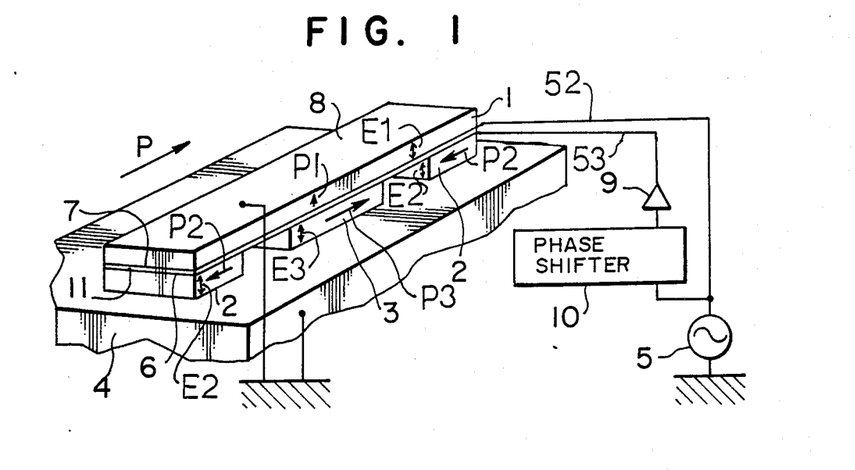
FIG. 1 is a diagram showing a configuration of a piezoelectric motor according to an embodiment of the present invention.
Figure 2:
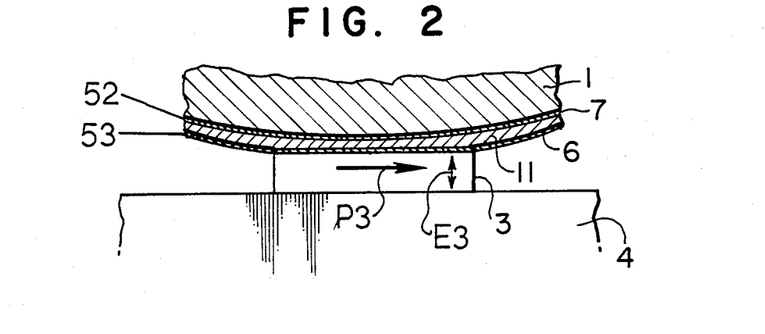
FIG. 2 is a partially enlarged view of FIG. 1.

When a warp of the vibrator 1 causes only the piezoelectric member 3 to contact the plate 4 while the piezoelectric member 2 is suspended, as shown in FIG. 2, the velocity component of the particles in the lower surface of the piezoelectric member 3 as viewed from the vibrator 1 is opposite in direction to the polarization. As a result, the moving unit including the vibrator and the piezoelectric members moves in the forward direction P shown in FIG. 1.

When only the piezoelectric member 2 is in contact with the plate, on the other hand, the moving unit is moved also in the same forward direction P since the piezoelectric member 2 is polarized in the opposite direction to the piezoelectric member 3.

FIG. 2 shows a condition of the motor of FIG. 1 in which only the piezoelectric member 3 is in contact with the plate 4. An adhesive insulating layer 11 is used to adhere the vibrator 1 to the piezoelectric members 2 and 3 with the electrodes 6 and 7 electrically insulated from each other by the adhesive insulating layer 11. Further, the appropriate elasticity substantially absorbs the deformation of the vibrator 1 this portion. The piezoelectric member 3 of high rigidity is thus not deformed substantially, so that the entire area of the lower surface of plate 3 is brought into contact with the plate 4.

The velocity of motion may be changed by changing the amplitude of the voltage applied to the electrode 6. This is easily realized by changing the gain of the amplifier 9. The amplitude of the voltage applied to the electrode 7 is determined by the magnitude of the load and the surface roughness of the plate or the like.

When the direction of motion is to be reversed, the phase is displaced by 180° with the phase shifter 10 thereby to move the moving unit in the reverse direction, that is opposite to arrow P.

According to the present embodiment using the resonance mode of a vibrator, a large displacement is obtained along the direction normal to the surface of plate 4 with a low voltage. It is also possible to reverse the direction of motion by changing the excitation frequency. If the length of the vibrator 1 and the thickness of the piezoelectric members 2 and 3 are selected properly taking the longitudinal vibration and the shearing vibration into consideration, it is possible to attain the same resonance frequency for the vibrator 1 and the piezoelectric members 2, 3 and thereby to use both in the resonant state.

This embodiment has realized a very compact linear motor with a simple construction by combining the primary resonance and the shearing deformation. A linear motor 2.5 cm in length could be produced with the excitation frequency of approximately 60 KHz.

Figure 3:
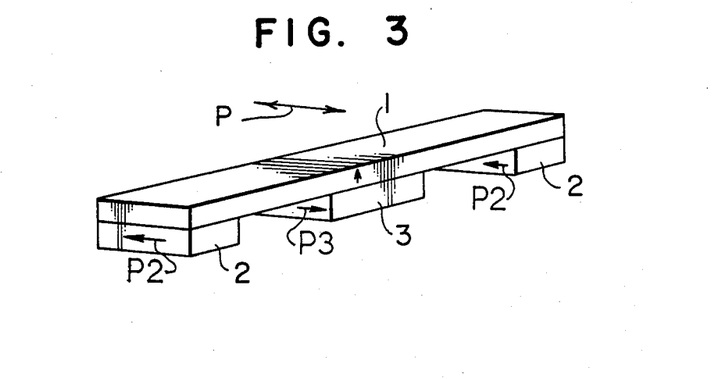
FIGS. 3 to 5 are diagrams showing other configurations of the piezoelectric motor according to the invention.

The direction of motion can be changed by changing the direction of polarization of the piezoelectric members 2 and 3. FIG. 3 shows an example comprising the piezoelectric members 2 and 3 polarized along the short side of the vibrating member. To obtain the operation of FIG. 3, the members 2, 3 are effectively detached from layer 11, rotated ninety degrees clockwise, as viewed from above, about a vertical axis and reattached to layer 11 to obtain the configuration of FIG. 3. The moving unit is moved in the direction perpendicular to the vibration of the vibrator (forward direction P).

If the aforementioned two linear motors are combined, by providing two sets of members 2, 3 oriented respectively according to FIGS. 1 and 2, a motor movable two-dimensionally is obtained.

Figure 4:
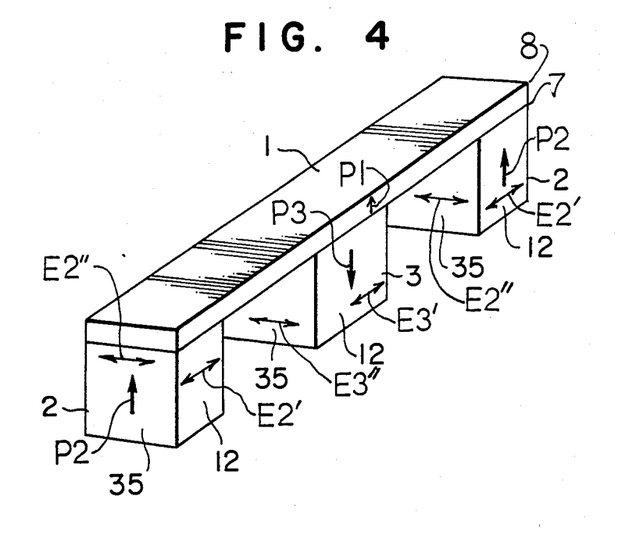

Further, the construction as shown in FIG. 4 reduces the size of the motor. The piezoelectric members 2, 3 for generating the driving force are polarized in the directions P2, P3 normal to the surface of plate 1. Electrodes 35 and 12 are attached on two sides of the piezoelectric members 2, 3 with all the remaining of four sides kept at earth potential. Using the power source and control 5, 9, 10, 52, 53 of FIG. 1, if the voltage in line 53 is applied to the electrode 35 it will thereby produce electric fields E2', E3' drive the moving unit 1, 2, 3 parallel to the longitudinal side of the vibrator, and if the voltage in line 53 is applied to the electrode 12, it will produce electric fields E2'', E3'' and the moving unit 1, 2, 3 moves parallel to the short sides of the vibrator 1. Applying the voltage of line 53 simultaneously to electrodes 12 and 35 would produce two dimensional motion.

Figure 5:
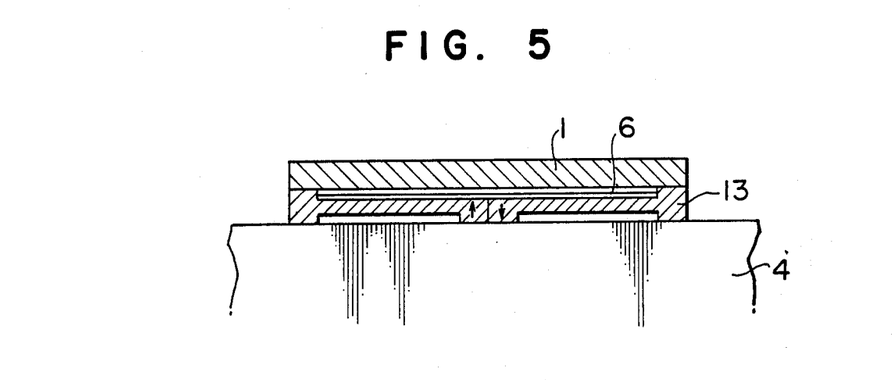

Unless the piezoelectric members 2 and 3 are used in their resonant state, the moving velocity is greatly limited. FIG. 5 shows an embodiment capable of producing a great moving velocity.

In FIG. 5, a plurality of piezoelectric members 13 are secured to the ends of the lower surface of the vibrator 1. Each piezoelectric member is polarized in opposite directions in the right and left parts, divided at the center thereof, and is in contact with the plate 4 at the center and the ends thereof. The electrode 6 applies an electric field parallel to the direction of polarization. In order to obtain a large displacement with a low voltage and a proper elasticity at the same time, each piezoelectric member is cut into thin form. This unit is connected to a power supply in the same manner as in FIG. 1.

Figures 6, 7:
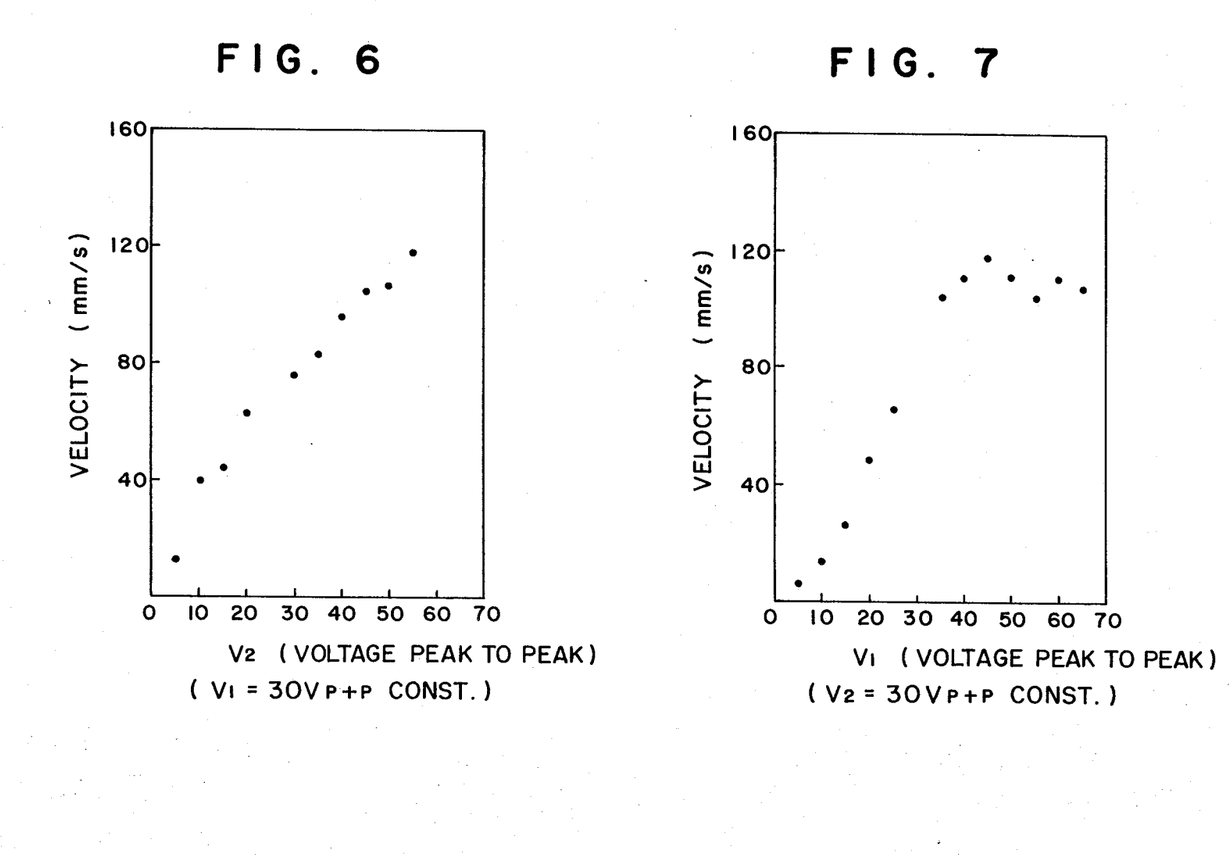
FIGS. 6 and 7 are diagrams showing the relationship between the applied voltage and velocity.

FIGS. 6 and 7 show the relationship between the applied voltage and the velocity. The motor comprises a vibrator 1 made from a piezoelectric plate with long and short sides of 25 mm and 6 mm in length, respectively. The piezoelectric member 13 has the same size as the vibrator 1 with the right and left half parts thereof polarized in opposite directions. Thin ceramic plates are attached to the three parts of the member 13 immediately adjacent to the plate 4. The voltage applied to the vibrator 1 is designated by $V_1$, and the voltage applied to the piezoelectric member 13 by $V_2$.

The embodiment under consideration, which is constructed in unimorph fashion, is operable with a lower voltage if constructed in bimorph way.

Apart from the embodiment described above which uses the primary vibration mode of the vibrator 1, a piezoelectric member is mounted at a position of maximum amplitude for the secondary and higher vibration modes. If vibrator 1 is so constructed that a load is secured to a node, that is a position of amplitude 0 on the upper surface of the vibrator, the effect of the vibration on the load during operation is minimized.

The vibrator mentioned above was illustrated in a form comprising only a piezoelectric plate to facilitate understanding. If a vibrator comprising a thin piezoelectric plate attached to a metal plate in general use is employed, however, the mechanical strength is improved.

Now, an application of the rotary motor will be explained.

Figure 8:
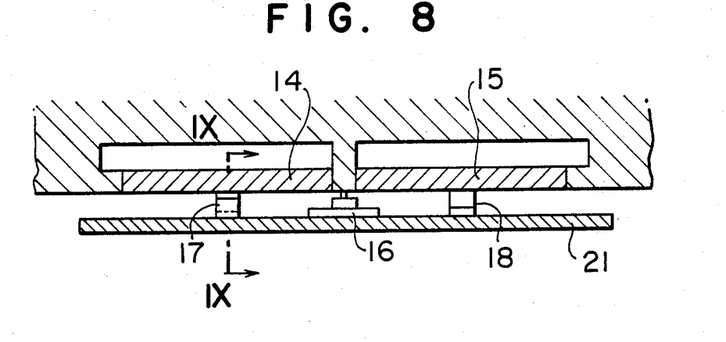
FIG. 8 is a diagram showing a configuration of a piezoelectric motor according to still another embodiment of the present invention.
Figure 9:
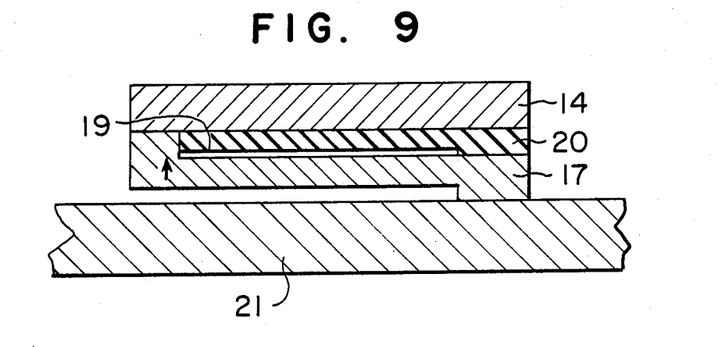
FIG. 9 is a sectional view taken in line A—A in FIG. 8.

FIGS. 8 and 9 show a configuration of a rotary motor having a construction capable of high-speed revolutions. FIG. 9 is an enlarged sectional view taken along line IX—IX in FIG. 8.

Rectangular vibrators 14 and 15 having the same construction as the above-mentioned vibrator 1 are fixed at the ends of a stator 22. (The stator 22 has an appropriate elasticity.) A rotor 21 in disk form having the rotational center thereof at the center of these parts is pressed against the piezoelectric members 17 and 18 with appropriate force. The piezoelectric members 17 and 18 are adapted to displaced along lateral directions by the potential of the electrode 19. An end of the piezoelectric members 17, 18 is fixed to a vibrator 14, 15 respectively and the other end thereof is in contact with the rotor 21. An elastic member 20 with sufficient plasticity is interposed between the piezoelectric members 17, 18 and the vibrators 14, 15 respectively.

The vibrators 14 and 15 are in the primary resonant state with the phases thereof displaced by 180° from each other. The piezoelectric members 17 and 18 are adapted to contract and expand in a phase displaced by 90° from the vibrators 14 and 15, thereby rotating the rotor 21. The rotational center 16 of the rotor 21 is aligned with the surface of the piezoelectric members 17 and 18 in contact with the rotor and the direction of displacement is perpendicular to the straight line of alignment. An elastic member 20, which is sufficiently plastic not to interfere with the change of the piezoelectric members, imparts a proper vertical resistance to the surface of contact between the piezoelectric members and the rotor. Further, if the torque is to be increased, four vibrators are arranged at 90° to each other and driven by four piezoelectric members mounted thereon. The vibrators 14 and 15, if provided as a bimorph vibrator molded with an elastic material, are capable of being operated with a lower voltage.

Figure 10:
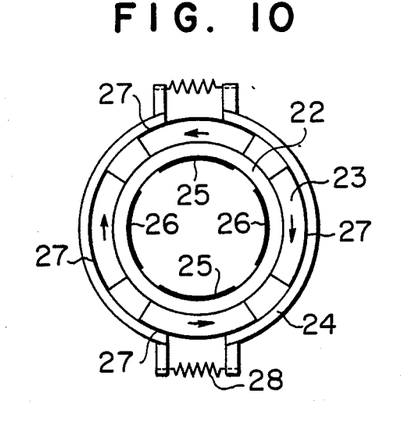
FIGS. 10 to 12 are diagrams showing a configuration of a piezoelectric motor according a further embodiment of the present invention.

FIG. 10 shows an embodiment of a rotary motor using the contraction/expansion of the shearing deformation and of a ring.

An annular vibrator 22 made of an electrostrictive member polarized along the radial direction and four piezoelectric members 23 mounted at a position of maximum amplitude make up a stator, the outer periphery of which is in contact with a rotor 24 by tension of a spring 28. The outer periphery of the vibrator 22 is at earth potential, and the vibrators 22 and the piezoelectric members 23 are subjected to an electric field along the radial direction by electrodes 25, 26 and 27. The secondary standing wave is adapted to be generated in the vibrator 22 by four electrodes 25 and 26. The piezoelectric members 23 is subjected to shearing deformation 90° out of phase with the secondary standing wave. These operations drive the rotor 24.

Figure 11:
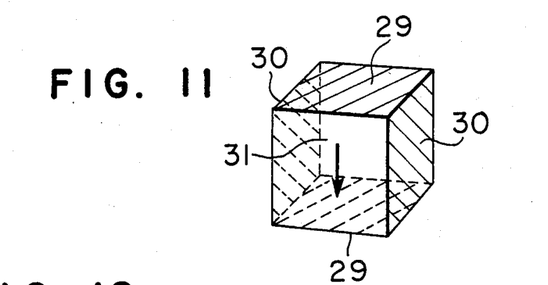

In each of the aforementioned embodiments, the vibrator for producing a standing wave and the piezoelectric members for generating a driving force are configured of separate piezoelectric and electrostrictive members. They may be replaced by a single piezoelectric member, however, by combining the longitudinal and lateral displacements with the shearing deformation. Such an embodiment is shown in FIGS. 11 and 12.

Electrodes 29 and 30 are mounted on a piezoelectric member 31 and are impressed with an alternating electric field in parallel and perpendicular to the direction of polarization shown by the arrow in the drawing, respectively. If the lower surface of this assembly is fixedly secured, for example, the particles in the upper surface thereof are set in an elliptical motion by displacing the alternating electric fields by 90° out of phase with each other. As a result, the moving unit is prodded into motion as in the case of an ultrasonic motor of the vibrating-reed type. If the dimensions of the piezoelectric member 31 are selected properly in consideration of the frequency constant, the assembly may be used in the resonant state in both longitudinal and lateral directions. Further, if an elastic member in bar form is mounted along the direction of polarization and the resonant state of the piezoelectric member along the longitudinal direction is combined with the lateral resonant state of the elastic member, it is possible to excite a large elliptical motion in the forward end surface of the elastic member.

Figure 12:
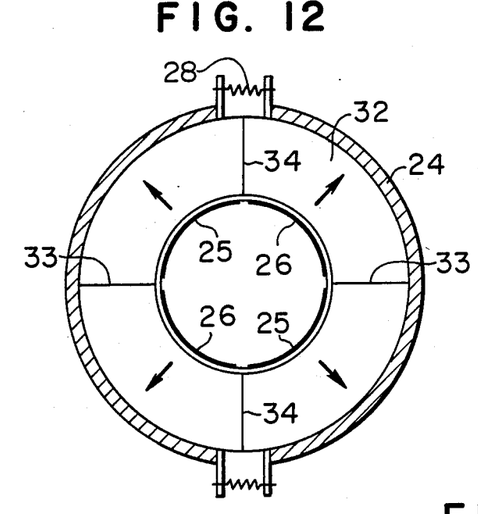

FIG. 12 shows a rotary motor of FIG. 10 realized with a single annular piezoelectric member 32.

Electrodes 33 and 34 are used to apply an electric field to the piezoelectric member 32, which is thus subjected to a shearing deformation. The electrode 33 is at earth potential, and the electrode 34 is impressed with an alternating voltage. The electrode 25, on the other hand, is impressed with a voltage 90° out of phase with the alternating voltage, and the electrode 26 with a voltage 180° out of phase with the electrode 25. The outer periphery of the annular piezoelectric member 32 is at earth potential.

A rotor 24 has an appropriate elasticity and is in contact with the piezoelectric member 32 by a wide area thereof. Particles in the outer periphery of the piezoelectric member 32 have a velocity component along the peripheral direction over a wide area due to the shearing deformation, and therefore a large driving force is capable of being generated as in the preceding embodiment.

In each of the above-mentioned embodiments, the area of contact between the stator and the rotor is preferably made of a material high in friction coefficient and wear resistance with small energy loss due to elastic deformation or the like.

Figure 14:
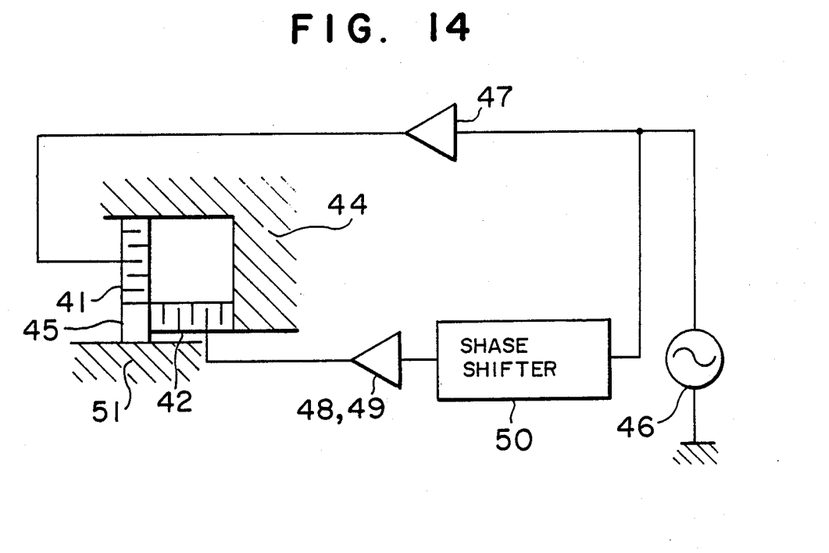
FIGS. 14 and 15 are diagrams showing a configuration of piezoelectric motor according to a still further embodiment of the present invention.
Figure 15:
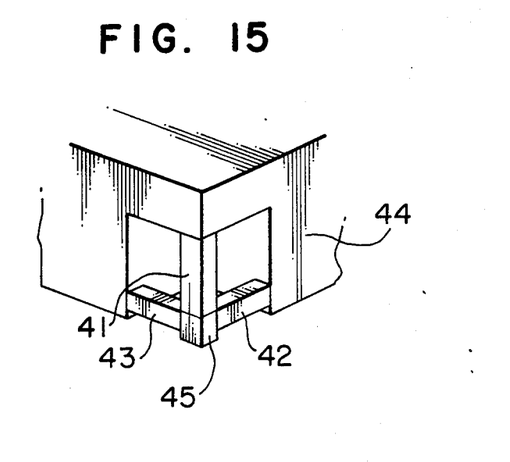

FIGS. 14 and 15 show a case in which the displacement of multilayered piezoelectric devices 41, 42 and 43, instead of the shearing deformation of a piezoelectric member, is used for generating the driving force of a motor. The multilayered piezoelectric device 43 is mounted perpendicularly to the page of FIG. 14, and has an end thereof fixed on a slider plate 44 with the other end thereof fixed to a slider block 45 resting on a stator (not shown). The multilayered piezoelectric device 43, on the other hand, though not shown in FIG. 14, is mounted in similar fashion in a position perpendicular to the multilayered piezoelectric devices 41, 42. The multilayered piezoelectric device 41 is mounted in a position perpendicular to the aforementioned two piezoelectric devices 42, 43. These three devices have substantially the same resonance point.

These devices are driven by a triangular wave of the resonance frequency of the multilayered piezoelectric device 41. A triangular wave supplied from an AC power supply 46 is amplified into a desired voltage by amplifiers 47, 48 and 49 respectively and applied to the multilayered piezoelectric devices 41, 42 and 43. If the devices 41 and 42 are provided with a the triangular wave retarded respectively by an appropriate angle through a phase shifter 50, for instance, these devices may be vibrated by 90° out of phase with each other. As a result, the block 45 performs an elliptical motion on the page of FIG. 14 and prods a rest 51 in a direction, thus generating a driving force in lateral directions in the drawing. In similar fashion, by driving the devices 41 and 43, a driving force is obtained in the direction perpendicular to the page of FIG. 14.

If a tripod including three multilayered piezoelectric devices of this construction is mounted at each of the four corners of the plate 44, the plate 44 is capable of performing linear and rotational motion with respect to the rest 51.

According to this embodiment, the vibration for generating a driving force and that for controlling the frictional force are both in resonant state, and therefore the energy conversion efficiency is high. Multilayered piezoelectric devices having comparatively honogeneous characteristics are available on the market, and the tripod is constructed by selecting those multilayered piezoelectric devices having similar resonant points in particular. Also, if the devices 42 and 43 are shortened and the resonance frequency increased, the phase shifter 50 is eliminated.

It will thus be understood from the foregoing description that according to the present invention the moving unit and the stator are placed in contact with each other by a large area, and the surface particles of the piezoelectric members have a uniform velocity component along the direction of driving, so that a large friction derived substantially prevents slip and deformation under strong pressure. As a result, both a large driving force and a high output efficiency as well as a superior wear resistance are obtained.

Further, in view of the fact that the distance covered in a period is selectable as desired, the ultrasonic motor according to the present invention finds a suitable application as a micro positioning mechanism.

Furthermore, the use of a standing wave greatly reduces the size of the linear motor.

Due to the selectability of the desired material making up the area of contact between the moving unit and the stator, on the other hand, a high efficiency is achieved.

We claim:

1. A piezoelectric motor comprising: a first element; a vibrator element mounted adjacent the first element; means for exciting a standing wave in said vibrator element; a plurality of piezoelectric actuators interposed between the vibrator element and the first element; and means providing alternating electrical energy to the piezoelectric actuators for deforming them in a fixed phase relationship with the standing wave thereby to generate a net driving force in one motion direction between the first element and the vibrator element.

2. A piezoelectric motor according to claim 1, wherein the vibrator element is tabular and the piezoelectric actuators are fixed at parts of the vibrator element corresponding to the loop and node of the standing wave.

3. A piezoelectric motor according to claim 2, wherein said means providing causes the piezoelectric actuators fixed on the vibrator element to be subjected to shear vibration.

4. A piezoelectric motor according to claim 2, wherein each of the piezoelectric actuators is a rectangular parallelopiped polarized along respective directions perpendicular to the motion direction; an electrode is mounted on each of two adjacent sides of the rectangular parallelopiped; means connecting the remaining sides thereof that are parallel to the direction of polarization at earth potential; said means providing, impressing a given one of the electrodes on the two adjacent sides with a sinusoidal voltage thereby to select one of the longitudinal motion and the lateral motion of the vibrator element.

5. A piezoelectric motor according to claim 1, wherein the vibrator element is tabular with the adjacent ends of the piezoelectric actuators fixed to the ends of the adjacent surface thereof; the piezoelectric actuators being tabular, elongated along the length of the vibrator element, polarized perpendicular to the length of the vibrator element, and having a central part and ends, with respect to the length, thereof in contact with the first element; and the piezoelectric actuators being polarized in opposite directions on the right and left sides, with respect to the length, of the central part thereof.

6. A piezoelectric motor according to claim 2, including adhesive means for bonding the vibrator element and the piezoelectric actuators and providing electrical insulative and elastic characteristics therebetween.

7. A piezoelectric motor according to claim 1, wherein the vibrator element is annular and made of a piezoelectric material polarized along the radial direction thereof and said piezoelectric actuators are mounted at positions of the maximum amplitude of the standing wave in the vibrator element; and the first element being annular in shape and having means providing contact with the outer periphery of the actuators under spring tension.

8. A piezoelectric motor according to claim 1, wherein a one of the piezoelectric actuators is of rectangular parallelopiped shape having a direction of polarization; said means providing also impressing alternating electric fields in the directions parallel and perpendicular to the direction of polarization respectively thereby to cause a longitudinal vibration and a shearing deformation in phase therewith, thereby generating a driving force.

9. A composite piezoelectric motor according to claim 1, wherein the piezoelectric actuators are four serially connected sectors together forming a single annular member, each sector polarized along the radial direction thereof; said means providing further impressing alternating electric fields in each of said sectors parallel and perpendicular to the direction of polarization respectively thereby to excite a longitudinal vibration and a shear deformation in pbase therewith; means mounting one of said elements for rotating; said one of said elements being an annular slider; and spring means for keeping said one of said elements in contact with the outer periphery of the annular member.

10. A piezoelectric motor comprising:
a stator having an upper surface;
a slider;
a slider block movable slidingly on the upper surface of said stator;
a first piezoelectric device connected between said slider block and said slider;
electric means adapted to vibrate said first piezoelectric device in a resonance fashion in a first direction in a plane parallel to the upper surface of said stator;
a second piezoelectric device connected between said slider block and said slider;
electric means adapted to vibrate said second piezoelectric device in a resonance fashion in a second direction different from the first direction in a plane parallel to the upper surface of said stator;
a third piezoelectric device connected between said slider block and said slider; and
electric means adapted to vibrate said third piezoelectric device in a resonance fashion in a direction perpendicular to the upper surface of said stator.

11. A piezoelectric motor comprising:
a first element;
a vibrator element constructed of piezoelectric material mounted adjacent the first element;
means for exciting a standing wave in said vibrator element to deform said vibrator with nodes and loops of the standing wave according to the distortion of the piezoelectric material caused by the standing wave, with such distortion being toward and away from said first element;
a plurality of piezoelectric actuators interposed between the vibrator element and the first element respectively a node and loop positions so that the actuators at loop positions will drivingly contact between said first element and said virator and the actuators at node opsitions will have no driving contact between said first element and said vibrator; and
means providing alternating electrical energy to the piezoelectric actuators for deforming them in a fixed phase relationship with the standing wave thereby to generate a net driving force in one motion direction between the first element and the vibrator element.

12. A piezoelectric motor according to claim 11, wherein said means providing causes the piezoelectric actuators fixed on the vibrator element to be subjected to shear vibration.

13. A piezoelectric motor according to claim 11, wherein each of the piezoelectric actuators is a rectangular parallelopiped polarized along respective directions perpendicular to the motion direction; an electrode is mounted on each of two adjacent sides of the rectangular parallelopiped; means connecting the remaining sides thereof that are parallel to the direction of polarization at earth potential; said means providing, impressing a given one of the electrodes on the two adjacent sides with a sinusoidal voltage thereby to select one of the longitudinal motion and the lateral motion of the vibrator element.

14. A piezoelectric motor according to claim 11, wherein the vibrator element is tabular with the adjacent ends of the piezoelectric actuators fixed to the ends of the adjacent surface thereof; the piezoelectric actuators being tabular, elongated along the length of the vibrator element, polarized perpendicular to the length of the vibrator lement, and having a central part and ends, with respect to the length, thereof in contact with the first element; and the piezoelectric actuators being polarized in opposite directions on the right and left sides, with respect to the length, of the central part thereof.

15. A piezoelectric motor according to claim 11, including adhesive means for bonding the vibrator element and the piezoelectric actuators and providing electrical insulative and elastic characteristics therebetween.

16. A piezoelectric motor according to claim 11, wherein the vibrator element is annular and made of a piezoelectric material polarized along the radial direction thereof and said piezoelectric actuators are mounted at positions of the maximum amplitude of the standing wave in the vibrator element; and the first element being annular in shape and having means providing contact with the outer periphery of the actuators under spring tension.

* * * * *